US006794779B2

(12) United States Patent
Ma et al.

(10) Patent No.: US 6,794,779 B2
(45) Date of Patent: Sep. 21, 2004

(54) COMPACT ELECTROMECHANICAL LINEAR ACTUATOR

(75) Inventors: Weijian Ma, Liverpool, NY (US); Gabriel Silva, Liverpool, NY (US)

(73) Assignee: Young & Franklin Inc., Liverpool, NY (US)

( * ) Notice: Subject to any disclaimer, the term of this patent is extended or adjusted under 35 U.S.C. 154(b) by 101 days.

(21) Appl. No.: 10/023,324

(22) Filed: Dec. 17, 2001

(65) Prior Publication Data

US 2003/0111924 A1 Jun. 19, 2003

(51) Int. Cl.[7] .............................. H02K 5/00; H02K 1/18
(52) U.S. Cl. ...................... 310/80; 310/217; 310/260; 310/91; 310/75 R; 310/254; 310/89; 74/25; 251/337
(58) Field of Search ...................... 310/80, 89, 217, 310/91, 75 R, 68 B, 254, 260; 29/596; 74/25; 251/129.11, 337

(56) References Cited

U.S. PATENT DOCUMENTS

| 3,682,283 A | * | 8/1972 | Sato .......................... 310/68 C |
| 3,693,759 A |  | 9/1972 | Schindel ...................... 185/40 |
| 3,877,629 A | * | 4/1975 | Louw et al. .................. 228/2.3 |
| 5,099,161 A |  | 3/1992 | Wolfbauer, III .............. 310/80 |
| 5,334,897 A | * | 8/1994 | Ineson et al. .................. 310/89 |
| 5,491,372 A |  | 2/1996 | Erhart .......................... 310/80 |
| 5,557,154 A |  | 9/1996 | Erhart .......................... 310/80 |
| 5,831,360 A | * | 11/1998 | Senjo et al. .................. 310/80 |
| 5,954,258 A | * | 9/1999 | Baader et al. ............ 310/68 R |
| 6,160,331 A | * | 12/2000 | Morreale ...................... 310/51 |
| 6,223,971 B1 |  | 5/2001 | Sato ............................ 228/45 |
| 6,570,282 B1 | * | 5/2003 | Ito et al. ....................... 310/80 |
| 6,572,076 B1 | * | 6/2003 | Appleford et al. ............ 251/69 |

FOREIGN PATENT DOCUMENTS

FR           2 592 535         1/1986

* cited by examiner

Primary Examiner—Karl Tamai
Assistant Examiner—Yahveh Comas
(74) Attorney, Agent, or Firm—Wall Marjama & Bilinski LLP

(57) ABSTRACT

An electromechanical linear actuator that contains an electric servo motor mounted within a compact housing. A thermally conductive path of travel is provided to efficiently transfer heat out of the housing into the surrounding ambient. A further mechanism is provided for holding the stator windings of the motor in undisturbed contact with the inner wall of the housing when the motor is subjected to thermal stress. The motor is arranged to linearly position a push rod through means of a ball screw unit. The ball screw nut and the push rod ride on bearings within guideways to insure that the push rod tracks along a linear path of travel.

10 Claims, 2 Drawing Sheets

US 6,794,779 B2

COMPACT ELECTROMECHANICAL LINEAR ACTUATOR

FIELD OF THE INVENTION

This invention relates to an electromechanical actuator and, in particular, to an electromechanical actuator that is ideally suited for use in controlling the positioning of a valve.

BACKGROUND OF THE INVENTION

More specifically, this invention involves an extremely compact electromechanical actuator. Actuators are well known in the art and are used in many applications where a reciprocating linear motion is needed for some intended purpose. These hydraulic or pneumatic devices, as well as electrically powered devices, and to some extent pneumatic actuators, are capable of being contained in compact packages, while at the same time being capable of delivering relatively high forces. These devices, however, develop leaks which render them unreliable or inoperative over a period of time.

Electrically powered devices are generally referred to as electromechanical actuators and have proven to be more reliable than the hydraulic and pneumatic devices and exhibit a relatively longer life. In addition, the electrical power devices afford greater control over the positioning of the device. The electrically powered devices, however, consume more space than their hydraulic and pneumatic counterparts. Heat disruption is sometimes a problem with the electrical devices, particularly when attempting to compact the actuator in a small package.

SUMMARY OF THE INVENTION

It is, therefore, a primary object of the present invention to improve linear actuators and, in particular, to improve electromechanical linear actuators.

A further object of the present invention is to provide a compact electromechanical linear actuator that is capable of delivering a relatively high linear force at high speed.

A still further object of the present invention is to provide an electromechanical linear actuator having improved control capabilities and a high force vs. stroke characteristic.

Another object of the present invention is to provide a compact electromechanical linear actuator that efficiently conducts motor generated heat to the surrounding ambient.

These and other objects of the present invention are attained by an electromechanical linear actuator that includes a hollow shaft and a brushless servo motor that is contained within a compact housing. The motor includes a stator containing the motor windings that is secured to an inner wall of the housing by a tapered wedge fabricated of a material having a high coefficient of thermal conductivity. The housing is provided with fins that surround the motor for dissipating heat efficiently into the immediate ambient. Springs are employed to hold the wedge supporting the motor stator in place to prevent displacement of the stator over a broad change in temperature. A rotor assembly is contained within the housing and includes an extended ball screw shaft that is aligned along the axis of the motor and coacts with a ball screw nut to position a push rod. The push rod and ball screw nut are linked to a linear guideway for directing the push rod along a linear path of travel.

BRIEF DESCRIPTION OF THE DRAWING

For a further understanding of these and other objects of the invention, reference will be made to the following detailed description of the invention which is to be read in connection with the accompanying drawing, wherein.

DETAILED DESCRIPTION OF THE INVENTION

Figure 1:
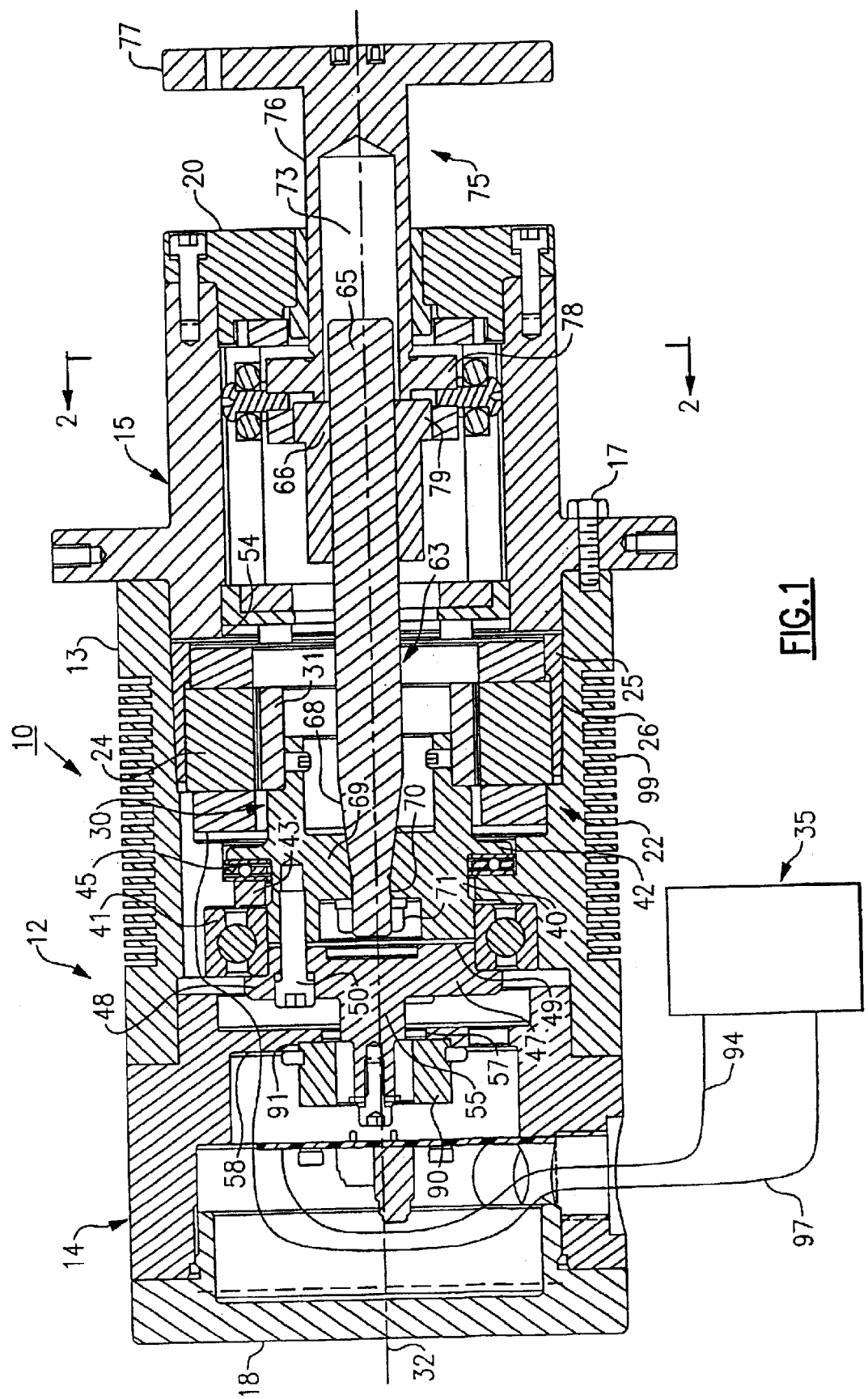
FIG. 1 is a sectional view of a linear actuator embodying the teachings of the present invention.

Referring now to the drawings, there is illustrated a compact electromechanical linear actuator, generally referenced 10, that embodies the teachings of the present invention. Although the present invention is ideally suited for controlling the positioning of a valve, the actuator can be employed equally as well in many other similar applications such as controlling the inlet vanes to a rotating machine or the like. The actuator includes a cylindrical housing 12 that includes a center section 13 and two end sections 14 and 15. The sections are brought togther in a telescoping relationship as shown in FIG. 1 with the sections being secured together by any suitable means such as press fitting, threaded connections or screws such as screw 17. End section 14 is closed in assembly by an end cap 18. End section 15 is similarly closed by means of a second end cap 20. A brushless permanent magnet servo motor, generally designated 22, is contained within the center section 13 of the housing. The stator assembly 24 of the motor is secured to the inside wall of the housing in a stationary condition by means of an annular wedge 25. The wedge includes tapered outer surface 26 that is fitted into a tapered opening in the housing that complements the wedge taper. In assembly, the wedge is inserted tightly between the body of the stator assembly and the tapered wall of the housing to securely hold the motor stator in a stationary condition. In this arrangement the stator contains the windings of the motor.

The motor rotor assembly generally designated 30 is rotatably contained within the housing so that the motor rotor 31, which contains a series of magnetic elements, turns about the central axis 32 of the housing. As will be explained in greater detail below, the servo motor is designed to yield a high energy density due to low rotating inertia and has greatly improved thermal performance. This type of motor is generally referred to as a brushless dc motor that behaves similarly to a brush type dc motor except for the method of commutation. The brushless motor is commutated by an electronic controller 35 rather than by brushes and commutator bars. Because there are no brushes to wear out, little or no motor maintenance is required over the life of the motor.

The motor rotor is supported upon a hub generally referenced 40 that is rotatably supported in the center section of the housing in ball bearing 41. The hub further contains a radially extended shoulder 42 that forms a space between an adjacent shoulder 43 on the central section 13 of the housing. A thrust bearing 45 is mounted in the space between the two shoulders to take up any axial loading exerted upon the rotor assembly. An end closure 47 is mounted on the bearing end of the rotor assembly which contains a flange 48 that is arranged to contact the ball bearing 41. A gap 49 is maintained between the end closure and the hub and a series of spaced apart screws 50 are passed through the end closure and are threaded into the hub. Tightening the screws draws shoulders 42 and 43 together thereby securing the thrust bearing in a preloaded condition in the rotor assembly. By the same token, the enclosure is drawn between shoulder 43 and flange 48 that is located upon the end closure. One or more Belville washers are mounted between the wedge 25 and end section 15 of the housing to provide a holding force against the wedge in assembly.

The end closure contains an extended nose section 55 that is rotatably mounted in the left hand end section 14, as viewed in FIG. 1. The nose section, in turn, is used to support a part of the electronic resolver 90 that is used to provide both position sensing data to the controller 35 along with motor control data.

A ball screw assembly generally referenced 63 is mounted in the rotor hub. The ball screw assembly includes a shaft 65 that is coaxially aligned along the center line 32 of the housing. A ball screw nut 66 is mounted upon the ball screw shaft 65 which is adapted to move linearly along the axis of the ball screw shaft as the shaft turns with the rotor. The ball screw assembly of the type shown is commercially available from Hewin Corporation and Jena Tech, Inc., or others.

The left hand end of the ball screw shaft contains a tapered section 68 that is contained within a complementary opening formed in wall 69 of the hub rotor 40. The end of the shaft further includes a threaded spline 70 that passes through the wall 69 and is engaged by a nut 71. Tightening the nut down pulls the tapered section of the shaft tightly into the complementary opening in the hub wall thereby locking the shaft tightly in the hub.

Figure 2:
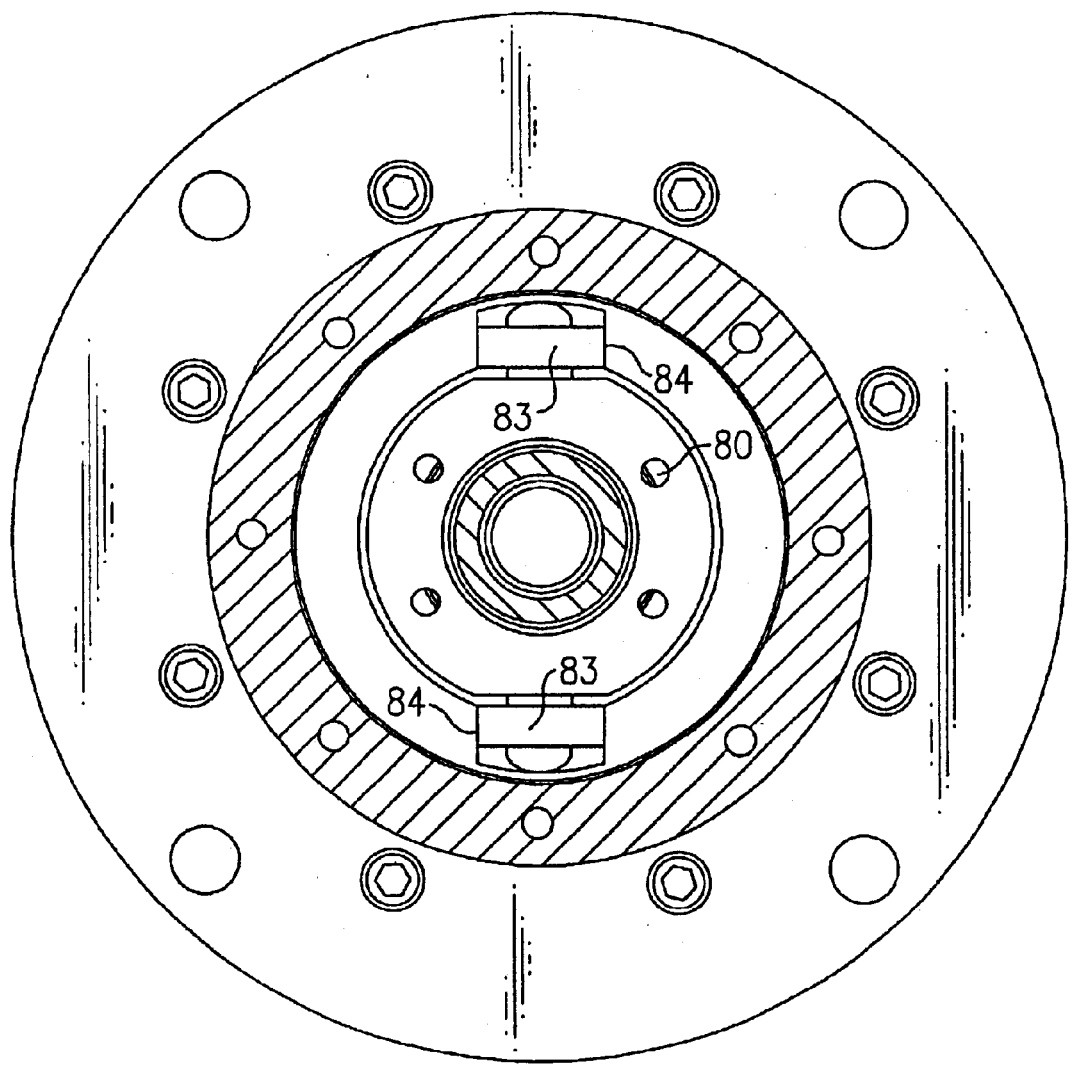
FIG. 2 is an enlarged section taken along lines 2—2 in FIG. 1.

The opposite end of the ball screw shaft is adapted to ride freely within a blind clearance hole 73 formed in push bar assembly 75. The push bar assembly includes an elongated rod 76 having a pusher disc 77 located at the distal end of the rod. An end flange 78 is located at the proximal end of the rod. The end flange 78 of the push bar assembly is located adjacent to a second flange 79 located upon the ball screw nut 66 and the two are connected in assembly by a series of screws 80 (FIG. 2). As best illustrated in FIG. 2, each flange is provided with a pair of ball bearings 83 that are arranged to ride in longitudinal guideways 84 that are formed in the housing end section 15 and which are aligned parallel to the axis 32 of the housing. The bearings are captured within the guideway and prevent rotation of the ball screw nut while at the same time insuring that the nut and the push bar assembly both move along a linear path of travel.

An electronic resolver unit 90 is mounted upon an internal shoulder 91 formed in end section 14 of the housing. The resolver is a combination of a stator and a rotor. The resolver stator is mounted upon the housing 14 and the rotor is mounted upon the shaft 55. The resolver is mounted concentrically to the motor rotor to provide exact motor position data to the controller 35 via line 94. The motor controller uses the position data to adjust the motor phase current for optimum motor torque output which is also referred to as the commutation process. Resolvers of this type are available from Admotec, Inc. and have windings and iron case materials similar to those of the motor.

The motor controller is externally mounted within an EM1 enclosure which also contains necessary capacitors and filters to accommodate for lengthy cables of up to at least 150 meters in length. The controller is microprocessor based and operates the actuator positioning loop. The controller monitors the rotor position via the resolver and provides a sinusodial current to the motor windings via line 97 to control motor torque. The controller employs pulse width modulation for high efficiency regulators of the motor phase current.

The stator wedge 25 and the center section 13 of the actuator housing are each fabricated of a material having a high coefficient of thermal conductivity. In addition, the center section of the housing is provided with a plurality of heat exchanger fins 99 that encircle the center section of the housing. Accordingly, any excessive heat that is generated by the motor windings is quickly and efficiently rejected into the surrounding ambient thereby keeping the temperature within the housing at a low level, that is, at a level at which the mechanical and electrical component located within the housing will not become thermally damaged. As noted above, the stator wedge is secured in place by a prestressed Belville washer so that the wedge will not be displaced from its holding position due to the thermal stress.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. An electromechanical actuator that includes:
    a housing having an opening passing therethrough that is centered about an axis;
    a brushless servo motor having a rotor assembly mounted inside said housing for rotation about said axis, said servo and a stator encircling the rotor assembly motor rotor containing a permanent magnet and said stator containing the motor windings;
    a tapered circular wedge tightly wedged between the stator and the inner wall of the housing within a tapered portion of said housing opening to stationarily support the stator within the housing;
    a bail screw shaft aligned along the axis and having a tapered end that is tightly secured within a complementary tapered hole in said rotor assembly of said servo motor so that said shaft extends outwardly beyond one end of the rotor assembly;
    a ball screw nut mounted upon the extended end of said shaft so that said nut moves axially along the shaft as the shaft is rotated by said motor;
    a pushbar unit slidably contained within an end wall of said housing said pushbar unit being connected to said ball screw nut for movement along said axis, and
    control means connected to said motor for activating the motor to advance or retract the push bar a desired linear distance.

2. The actuator of claim 1 wherein said ball screw nut contains a first radially extended flange and said pushbar contains a first radially extended flange and said push bar contains a second radially extended flange and further includes means to connect the flanges so that the push rod moves axially with said ball screw nut.

3. The actuator of claim 2 that further includes axially extended guideways contained within said housing and bearing means associated with said flanges for guiding the ball screw nut and push bar unit along the axis of said housing.

4. The actuator of claim 1 that further includes an end cap mounted upon one end of said rotor assembly having an axially aligned stub shaft protruding from said end cap and a resolver secured to said stub shaft for providing motor position information to said control means.

5. The actuator of claim 1 wherein said housing contains a first section and a second section that contains a necked down end that telescopes into the opening of the first section adjacent to said motor stator and wedge spring means for acting between the necked down end of the second section to urge the wedge axially into a secure stator holding position.

6. The actuator of claim 5 wherein said spring means includes Belville spring washers.

7. The actuator of claim 1 that further includes thrust bearing means acting on said rotor assembly for relieving axial loads acting upon the rotor assembly.

8. The actuator of claim 1 that further includes thrust bearing means acting upon the rotor assembly for attenuating thrust loads upon said rotor assembly.

9. The actuator of claim 8 that further includes roller bearing means acting upon said rotor assembly for attenuating radial loads acting upon said rotor assembly.

10. The actuator of claim 1 wherein said tapered wedge and at least a portion of said housing engaged with said wedge are fabricated from a material having a high thermal conductivity.

* * * * *